United States Patent Office 2,921,947
Patented Jan. 19, 1960

2,921,947

PROCESS FOR PREPARING ESTERS OF EPOXIDIZED COPOLYMER DRYING OILS, AND RESULTING PRODUCTS

Ronald L. Millar, Elmhurst, and Sol B. Radlove, Chicago, Ill., assignors to The Glidden Company, Cleveland, Ohio, a corporation of Ohio No Drawing. Application June 21, 1955
Serial No. 517,096

7 Claims. (Cl. 260—410.6)

This invention relates to novel reaction products of epoxidized hydrocarbon drying oils with carboxylic acids and/or esters having one available carboxyl group, and to coating compositions comprising said reaction products. More particularly, our invention relates to reaction products of epoxidized butadiene-styrene polymers with hydrocarbyl monobasic carboxylic acids, and especially it relates to said reaction products in which the said carboxylic acid(s) contain 7–20 carbons, such as straight chain aliphatic monobasic acids having from eight to twenty carbon atoms, unsubstituted aromatic monobasic acids of at least 7 carbons and their lower molecular weight alkyl substituted derivatives, and rosin acids and mixtures thereof.

Epoxidized conjugated diolefin-monocyclic vinyl aromatic copolymer materials, especially those containing residues of $C_4$–$C_6$ conjugated diolefins, are described and claimed in copending application of H. J. Kiefer, Serial No. 515,208, filed June 13, 1955. The preferred diolefin-monocyclic vinyl aromatic copolymers thereof are hydrocarbon drying oils synthesized by polymerizing $C_4$–$C_6$ diolefins (60–90%) and styrene (40–10%) in the presence of sodium as a catalyst, and are like the oils described and claimed in U.S. Patent No. 2,652,342. These oils are our starting materials and as pointed out in the latter patent, can involve the substitution of all or at least a part of the butadiene feed with other diolefins such as isoprene, 2,3-dimethyl butadiene-1,3, piperylene, or 2-methyl pentadiene-1,3, and can involve the replacement of styrene with its various ring-alkylated homologues such as the various methyl styrenes, dimethyl styrenes, ethyl styrenes or diethyl styrenes. We will hereinafter, for convenience, refer to them as "C-oil." The epoxidized products derived from "C-oil" will be referred to as epoxy "C-oil." The disclosure of U.S. Patent 2,652,342 is here incorporated by reference.

In the art of preparing synthetic drying oils, various approaches have been pursued and depending upon the specific end use for which the product was designed, the attempts have met with more or less success. Among the difficulties which have been encountered with various synthetic hydrocarbon drying oils are poor drying rate, poor adhesion of either baked or air-dried coatings, poor flexibility, poor wetting properties and compatibility which results in difficulty in grinding of pigments and of additives, poor gloss and streakiness of brushed films. Polymeric materials of the type exemplified by "C-oil" have been investigated as possible drying oils since these materials, upon being subjected to heat as in a baking process, undergo further polymerization at an acceptable rate. However, "C-oil" has been found to be particularly deficient in pigment wetting power. Treatment with maleic anhydride, as disclosed in U.S. Patent 2,652,342, overcame this deficiency to some extent, but for many applications this altered material gave films which were characterized by poor flexibility on metal surfaces, especially tinplate. Further, although thin films from this altered drying oil could be cured satisfactorily, thick films, i.e., on the order of more than 1 mil., remained soft and exhibited poor metal adhesion.

Epoxidation of "C-oil," as conducted by the process described in the copending application of Radlove and Davis, Serial No. 515,783, filed June 15, 1955, produced hard films having improved adhesive properties but poor flexibility on metal surfaces.

We have now found that the preparation from "C-oil" of an esterified synthetic drying oil characterized by improved compatibility with other resinous materials and good pigment wetting power and further characterized by yielding films on metal which are hard, flexible, and adherent can be accomplished by epoxidizing the "C-oil" and reacting the epoxidized "C-oil" with organic hydrocarbyl monocarboxylic acid(s) having 7–20 carbons. The epoxidized oil should preferably have an oxirane oxygen content of at least 0.25%.

As is well known in the art, peracids (such as peracetic acid) react with olefinic unsaturated compounds to form epoxy derivatives. This general reaction is illustrated by the following general equation:

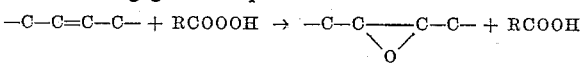

where R stands for an alkyl radical or hydrogen.

The epoxide linkage further is known to be sensitive to acid reagents, it having been shown by Swern and others that in the presence of acids, such as acetic acid, the epoxides react in the manner indicated by the following general equation:

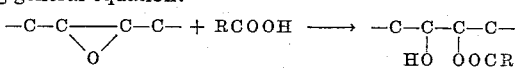

In the presence of a second mole equivalent of acid, the diester can be formed as indicated by,

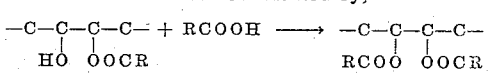

These reactions indicate the course which our novel process follows. Thus, depending upon the molar concentration of epoxy "C-oil" and carboxylic acid, the resulting product can be essentially the vicinal hydroxy, acyloxy derivative, or the vicinal diacyloxy derivative, as well as being mixtures of these derivatives. As indicated in the copending application of Radlove and Davis, supra, "C-oil" can be epoxidized to different degrees of completeness. The extent of reaction can be measured by determining the oxirane oxygen value and the reduction in unsaturation. The oxirane value gives a measure of the amount of epoxy groups available for reaction with the carboxylic acids. As can be seen, a maximum of two molar equivalents of acid can react with each epoxy group, and hence the quantity of acid to be used will depend upon the extent of epoxidation which has been effected and on the extent of esterification desired.

The improved products of this invention can be prepared by first mixing epoxidized "C-oil" with a predetermined quantity of a carboxylic acid. The mixture is then heated to cause the reaction to occur, which reaction is continued with suitable steps being taken to remove water formed in the reaction, until the acid value has been reduced to a satisfactory point below 40 and preferably below 12 on a solids basis.

The resultant product can be used as such or blended with other materials, e.g., resin(s), pigments, fillers, modifiers, etc.

By these and other ways illustrated below, we have succeeded in modifying the original film-forming properties of the "C-oil" to the point where tough, flexible, adherent protective metal coatings can be obtained by baking (e.g., for 20 minutes at 325° F.) a thin film of the modified drying oil on metal surfaces. These new oils are characterized also by their surprisingly increased compatibility with other resinous materials. Our novel modified oils are therefore eminently capable of use in the preparation of improved priming compositions for metal surfaces and in compositions designed for the lining and/or coating of cans for edible products. We have made the further surprising discovery that by reaction with epoxidized "C-oil" of selected carboxylic acid which is capable of cross polymerization, such as soya fatty acids, half esters of maleic acid, unsaturated fatty alcohol, half esters of saturated dicarboxylic acid, etc., reaction products are produced which on air drying or baking form a tough adherent coating for metal. Such reaction products are excellent vehicles for enamels, prime coats and other protective and/or decorative compositions, particularly for metals. On the other hand, by selection of non-polymerizable carboxylic acid, such as pelargonic acid, capric acid, lauric acid, etc., the resulting reaction products with epoxy "C-oil" are eminently suitable for protective linings for cans, the films being characterized by flexibility, adherence and excellent wetting properties. The reaction products of our invention represent a significant improvement over the "C-oil" itself and over the epoxy "C-oil" as products useful in the protective coating field.

The following specific examples will illustrate the several modes of preparing the novel compounds and compositions of our invention.

*Example 1*

A. To 60.5 g. of epoxidized "C-oil" (sodium polymerized 80% butadiene–20% styrene) having an oxirane value of 2.9%, prepared as described in copending application of Radlove and Davis, supra, and containing 50% solids in straight run mineral spirits boiling between about 150° and 200° C., 37.4 g. of rosin acids (The Glidden Co.'s Nelio Rosin WG, being their designation for gum rosin) were added. The mixture was heated to and maintained at reflux for 16 hours. The mass at this time had become too thick to be agitated and the reaction was terminated. About 6 g. of butyl alcohol was added to reduce the viscosity and the resultant mass was diluted to 50% solids by the addition of mineral spirits (a naphtha of boiling range 160° C. to 200° C.).

The product had the following characteristics:

NVM _____ 50%.
Viscosity (Gardner) _____ $Z_6$ to $Z_7$.
Color (Gardner) _____ 9 to 10.
Acid number _____ 17.

B. In a similar manner, 36.9 g. of the epoxidized "C-oil" and 45.9 g. of rosin acids (Nelio Rosin WG) were reacted. In this instance the reaction proceeded for 24 hours before the mass became too thick to agitate. The resultant mass (after thinning as in part A) had the following characteristics:

NVM _____ 50%.
Viscosity (Gardner _____ $Z_3$ to $Z_4$.
Color (Gardner) _____ 9 to 10 clear.
Acid No. _____ 34.2.

C. The products of parts A and B, above, were evaluated as protective coating compositions for metal by dissolving one part of the product in two parts of mineral spirits. This solution was poured on steel test panels. The excess was permitted to run off and then the panel was baked for ten minutes in a forced draft oven at 400° F. For comparison a similar test was run as a control test, using a sodium-polymerized 80% butadiene-1,3-20% styrene synthetic drying oil prepared in the manner described in U.S. Patent No. 2,652,342.

| Control | Film Hard | Bead very Soft. |
|---|---|---|
| Part A | Film slightly short | Bead Hard. |
| Part B | Film Short | Bead Hard. |

D. The condensation products prepared in parts A and B, above, were mixed with equal parts by weight of several resins to test their compatibility with the latter. The mixtures with MX–61, a triazine-aldehyde resin manufactured by Rohm and Haas, were homogeneous; while with Melmac 247–10, a melamine-formaldehyde reaction product of American Cyanamid Company, the mixtures were incompatible. Mixtures of equal parts by weight of the condensation products with MX–61 and mineral spirits were compatible.

Mixtures of equal parts by weight of the condensation products with Melmac 247–10 and mineral spirits were also compatible.

*Examples 2–5*

A. A series of condensations were effected between epoxidized "C-oil" (sodium polymerized 80% butadiene/20% styrene copolymer) having an oxirane value of 3.0% and a solids content of 58%, and varying proportions of rosin acids or p-tertiary butyl benzoic acid. The runs were carried out in substantially identical manner by first removing the solvent contained in the epoxidized "C-oil" and then heating the reactants at 430° F. until the mass had thickened. The mass was then diluted with mineral spirits. The results of these experiments are given in tabular form below:

| Example | Percent Epox. "C-oil" | Acid | | Acid Value of Product | Solids Content of Product |
|---|---|---|---|---|---|
| | | Type | Percent | | |
| 2 | 90 | Rosin | 10 | 3.2 | 43.2 |
| 3 | 80 | Rosin | 20 | 6.1 | 47.4 |
| 4 | 65 | Rosin | 35 | 7.4 | 50.0 |
| 5 | 80 | ptbba [1] | 20 | 3.3 | 50.0 |

[1] p-tertiary butyl benzoic acid.

B. The compatibility of the above condensation products with resinous materials was tested by mixing three parts of the condensation product with one part of the resin indicated below. These mixtures were diluted with four parts of xylene. The resultant mixtures were then poured out on glass plates, the excess permitted to drain off and the coated plates baked for thirty minutes in a forced draft oven at 300° F. The clarity of the resulting films is given in tabular form below:

| Example | No Resin | MX–61 | Medium Oil Alkyd Resin | Alkyd Resin | Urea-formaldehyde resin, Glidden Co. |
|---|---|---|---|---|---|
| 2 | Clear | Clear | Incompatible | Incompatible | Incompatible. |
| 3 | do | do | do | do | Do. |
| 4 | do | do | Clear | Hazy | Do. |
| 1-A | do | do | do | Clear-Hazy | Do. |
| 5 | do | do | do | Hazy-Incompatible | Do. |
| Epoxy C-oil | do | Clear-Hazy | Hazy | Incompatible | Do. |
| C-oil | do | do | do | do | Do. |

These mixtures were also poured on steel test panels and baked as indicated below for ten minutes at 400° F. or 30 minutes at 300° F. The bead, i.e., the thickened portion of the film at the bottom edge of the test panel, was examined to determine the character of the coating. A comparative scale of hardness from zero (soft) to 5 (hard) was arbitrarily set up. Those beads which were especially brittle were characterized by the letter "B" in the following table:

| Example | 10'/400° F. (No Resin) | MX-61 10'/400° F. | 30'/300° F. (No Resin) | MX-61 30'/300° F. | Alkyd A,[1] 30'/300° F. | Alkyd B,[1] 30'/300° F. | Butylated Urea-form-aldehyde Resin 30'/300° F. |
|---|---|---|---|---|---|---|---|
| 2 | 1 | 3 | 1 | 2 | 0+ | | |
| 3 | 2+ | 4 | 1+ | 2+ | | | |
| 4 | 3 | 5 | 2+ | 4 | 1+ | 1+ | |
| 1-A | 5B | 5B | 5B | 5B | 1 | 2 | 4+ |
| 5 | 3 | 5 | 2 | 3+ | 1+ | 1+ | |
| Epoxy C-oil | 0 | 1 | 0 | 0 | 0 | | |
| C-oil | 0 | 1 | 0 | 0 | 0 | | |

[1] Alkyd A: A medium oil-length alkyd; Alkyd B: Medium oil-length soya alkyd.

*Example 6*

A mixture of 165 g. of epoxidized "C-oil" (sodium-polymerized 80% butadiene/20% styrene) solution containing 100 g. solids and having an oxirane value of 2.5% with 30 g. of p-tertiary butyl benzoic acid was heated in an atmosphere of carbon dioxide to between 170° and 185° C. for about five hours. Thereafter, the viscous, pale orange, clear solution of esterified "C-oil" having an acid value of 10.5 and a solids content of 69% was cooled to about 25° C. This solution when flow coated and then baked on a steel test panel for 20 minutes at 325° F. gave a hard, tough film and bead. Addition of 38 g. of xylene to 100 g. of the esterified product yielded a solution giving a clear, glossy, hard tough film with a hard tough bead when baked on a steel test panel for 20 minutes at 325° F. This baked panel was immersed in cold water for 66 hours. The coating was still hard and clear.

*Examples 7–16*

The condensation reaction of Example 6 was repeated using different monobasic acids. The reaction conditions and characteristics of the products are given in the following table.

| Ex. | Epoxy C-Oil Solution, Example 6 G. | Acid | Condensation Temp., ° C. | Time in Hours | AV of Product 100% Solids Basis |
|---|---|---|---|---|---|
| 7 | 165 | 30 g. Stearic | 180–210 | 7 | 8.8 |
| 8 | 165 | 30 g. Oleic | 145 | 6½ | 10.5 |
| 9 | [1] 165 | 27 g. Benzoic | 190–195 | 4 | 27.0 |
| 10 | [1] 165 | 28 g. Pelargonic | 190–195 | 6 | 8.4 |
| 11 | [1] 160 | 42 g. Pelargonic | 190–200 | 8 | 28 |
| 12 | [1] 2,475 | 420 g. Pelargonic | [2] 190 | 12½ | 9.6 |
| 13 | [1] 165 | 28 g. Caprylic | 190–195 | 12 | 10.1 |
| 14 | [1] 165 | 30 g. Capric | 194 | 12 | 9.5 |
| 15 | [1] 165 | 30 g. Lauric | 195 | 12 | 7.7 |
| 16 | [1] 165 | 28 g. 2-Ethylhexoic | 192 | 2¾ | 38.6 |

[1] Oxirane value=2.9% on C-oil solids.
[2] After distillation of 400 g. of solvent.

The condensation products prepared as indicated in these examples were diluted with mineral spirits to 50% solids. The resulting solutions, when cast as films and then baked on steel test plates for ten minutes at 400° F., gave hard tough protective coatings.

The condensation products derived from pelargonic acid when applied to electrolytic tin plate gave coatings which were hard, flexible, and had good adhesion. There was no tendency to crawling or eye-holing.

*Example 17*

A mixture of 165 g. of the epoxy "C-oil" solution of Example 6 (100 g. solids) having an oxirane value of 2.9% with 20 g. of acetic acid was heated to and maintained at 90° C. for 4 hours. After the addition of 18.5 g. of acetic anhydride, the mass was heated at 120° C. for 3 hours and finally to 210° C. (pot temperature). The solvent and acetic acid which distilled were collected. It was determined from the saponification number that 10.7% of acetic acid had combined with the epoxy "C-oil."

The batch was diluted with 20 g. of mineral spirits and 38 g. of xylene. The solution, containing 52.7 solids, had an acid value of 3.8 (100% solids basis) and a saponification number of 53.0.

*Example 18*

In a 5 liter 3 neck round bottom flask fitted with an agitator, a thermometer, a gas inlet tube and a Dean-Stark water separator were mixed and agitated 1600 g. of a 93.5% solution of "C-oil" in mineral spirits, 875 g. of mineral spirits, 420 g. of pelargonic acid and 67.5 g. of 88% formic acid. To this mixture was added 225 g. of 50% hydrogen peroxide during a period of 45 minutes. The temperature of the mass rose spontaneously to 36° C. during the peroxide addition. Thereafter the mass was heated to and maintained between 40° and 55° C. for 2¼ hours. The temperature then was gradually raised to 100° C. in one hour, at which time an azeotrope consisting of mineral spirits, formic acid, and water commenced to distill. About 170 ml. of distillate was collected. Thereafter the temperature rose to 191° C. during which time an additional 400 ml. of mineral spirits distilled. The mass was heated at 190° to 200° C. until the acid value was 13.1. About 1100 ml. of mineral spirits was added and the mixture was cooled to about 25° C. The cooled mass had a viscosity of V (Gardner scale), an acid value of 11.6 (100% solids basis), and a solids content of 53%.

In a similar preparation, the epoxidation was effected in the absence of pelargonic acid, which was added to the mass about two hours after the addition of peroxide. This preparation had a final viscosity of T (Gardner scale), and an acid value of 10.4, with a solids content of 50%.

Analogously, a condensation product was obtained by adding 420 g. of caprylic acid to a "C-oil" epoxidation reaction mixture. The resulting product had an acid value of 13.7 (100% solids basis).

With capric acid, a condensation product having an acid value of 12.3 (100% solids basis) was obtained.

With lauric acid, a product having an acid value of 6.25 (100% solids basis) was obtained.

The foregoing examples illustrate the preparation of the products of our invention. As can be readily seen, these new products are useful either by themselves or in combination with other materials in the preparation of coating compositions having desirable attributes. Our invention is not to be limited, however, by the details of the above illustrations, since our invention is of broad scope with respect to the products thereof and the process for preparing said products. For example, the extent of epoxidation in the "C-oil" or other sodium-polymerized copolymer hydrocarbon drying oil used as one of the starting materials is subject to wide variation. With an epoxidized "C-oil" having a low oxirane value, i.e., less than 1%, a limited quantity of ester product can be obtained and hence the desirable characteristics of the products of our invention will be obtained to a correspondingly limited degree. In some applications of the novel compounds this will be desirable. Conversely, a highly epoxidized "C-oil," i.e., above about 4%, will give rise to esterified reaction products having a relatively large amount of ester groups. The quantity of monocarboxylic acid can be varied over a wide range. As indicated above, 2 mol equivalents of this reactant is consumed on a theoretical basis, for each mol equivalent of oxirane group present in the epoxidized "C-oil." For some end uses, one or both hydroxyl groups resulting from the opening of the epoxide can be acylated. It is of importance to continue the reaction to the point where the acid value of the reaction mixture is low, or at such a value as to indicate that substantially all of the monocarboxylic acid has been consumed in the reaction. The presence of substantial amounts of free carboxylic acid is detrimental to the alkali resistance of the protective coating prepared from the reaction product.

The process details also can be varied considerably. As indicated in the examples, one can start out with the "C-oil," epoxidize it in the presence or absence of the acid, and if the latter, add the acid and effect the condensation. The presence of the diluents, water, formic acid (or other peracid-forming acid) act to delay the ester formation. Upon their removal, the condensation takes place.

The esterified oils of our invention are eminently suited for the preparation of coating compositions, the specifications for which can be varied over wide limits. Because of their improved properties, the esters are suitable for use individually or in admixtures as a vehicle for a variety of pigments, toners, thickeners, thinners, resin adjuvants, and the like.

Additionally, the improved drying oils of this invention are satisfactory for use in many instances as protective coatings having desirable characteristics. They can be modified, if desired, by admixture with other drying or semi-drying oils, such as linseed oil, soybean oil, Chinawood oil, and other saturated and/or unsaturated vegetable oils.

The selection and utilization of the particular monocarboxylic acid or mixture of acids to a large extent determines the characteristic of the final condensation product. A monocarboxylic acid which can give rise to cross linking produces on drying a hard coating. Whereas, the selection of a monocarboxylic which is not capable of cross-polymerization gives rise to more flexible films. Our invention contemplates the utilization of all hydrocarbyl monocarboxylic acids having 7–20 carbons and mixtures of two or more of such acids. It will be within the ability of those skilled in this art to select those combinations of acids which will give rise to products best suited to the particular problem at hand.

Where in the above description of our invention, mention has been made of "rosin acids," it is intended that this term shall include the mixture of essentially abietic and 1-pimaric acids obtained from rosin. The acids obtained from wood rosin, gum rosin, and tall oil will differ somewhat in their properties. Rosin acids obtained from gum rosin are preferred, although those from other sources, as well as derivatives of these acids, such as hydrogenated rosin acids, are included within the scope of the term "rosin acids," as used in our invention.

Having described our invention, what we claim is:

1. The process which consists essentially of reacting monocarboxylic hydrocarbyl acid of 7–20 carbons with epoxidized hydrocarbon copolymer drying oil which has been prepared by sodium-polymerization of 60–90% by weight of 4–6 carbon conjugated diolefin balance monocyclic monomeric vinyl aromatic hydrocarbon selected from the group consisting of styrene, the methyl ring-alkylated homologues thereof and the ethyl ring-alkylated homologues thereof, and which has been epoxidized subsequent to polymerization to an oxirane oxygen content of at least 0.25% by weight, said reaction between said monocarboxylic acid and epoxidized oil being effected under esterifying conditions (a) with sufficient monocarboxylic acid to provide between about one and two mols of carboxylic acid per mol of oxirane oxygen in said epoxidized oil, and (b) until an acid number below about 40 has been secured in the reaction mass, thereby to produce ester linkages joining radicals of said monocarboxylic acids with vicinal carbon atoms of original epoxy groups in said epoxidized drying oils, said monocarboxylic acids being selected from the group consisting of straight chain aliphatic acids of 8–20 carbons, unsubstituted aromatic acids containing at least 7 carbons, lower molecular weight alkyl substituted derivatives of said aromatic acids, rosin acids, and mixtures thereof.

2. The process as claimed in claim 1 wherein the diolefin is butadiene and butadiene is present in amounts between 75% and 90%, and wherein styrene is the monocyclic vinyl aromatic hydrocarbon.

3. The process as claimed in claim 2 wherein the said reaction between monocarboxylic acid and epoxidized oil is effected under esterifying conditions until an acid number below about 12 has been secured in the reaction mass.

4. The process so claimed in claim 3 wherein the oxirane oxygen content of epoxidized hydrocarbon oil is between about 1% and 8% by weight.

5. The film-forming reaction product produced by the process of claim 1.

6. The film-forming reaction product produced by the process of claim 2.

7. The film-forming reaction product produced by the process of claim 4.

References Cited in the file of this patent

UNITED STATES PATENTS

| 2,660,563 | Banes et al. | Nov. 24, 1953 |
| 2,698,840 | Dyer et al. | Jan. 4, 1955 |
| 2,709,662 | Koenecke et al. | May 31, 1955 |

FOREIGN PATENTS

| 464,163 | Canada | Apr. 4, 1950 |

OTHER REFERENCES

Nicolet and Poulter: J.A.C.S., vol. 52, 1930, pages 1186–1188.